US009118492B2

(12) United States Patent
Pancorbo Marcos et al.

(10) Patent No.: US 9,118,492 B2
(45) Date of Patent: Aug. 25, 2015

(54) METHOD AND APPARATUS FOR AUTHORIZING A TRANSACTIONAL SERVICE BY A POLICY AND CHARGING CONTROL ARCHITECTURE

(75) Inventors: Maria Belen Pancorbo Marcos, Madrid (ES); Benny Gustafsson, Läckeby (SE); Hans Mattsson, Bollebygd (SE); Louis Segura, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 798 days.

(21) Appl. No.: 13/309,011

(22) Filed: Dec. 1, 2011

(65) Prior Publication Data

US 2012/0290452 A1 Nov. 15, 2012

Related U.S. Application Data

(60) Provisional application No. 61/483,815, filed on May 9, 2011.

(30) Foreign Application Priority Data

Nov. 7, 2011 (EP) .................................. 11188037

(51) Int. Cl.
*G07B 17/00* (2006.01)
*G07F 19/00* (2006.01)
(Continued)

(52) U.S. Cl.
CPC ........... *H04L 12/1407* (2013.01); *H04M 15/00* (2013.01); *H04M 15/66* (2013.01)

(58) Field of Classification Search
CPC ............ H04L 12/14; H04L 12/1403–12/1467; G06Q 30/00; G06Q 30/04; G06Q 40/00; H04W 92/04; H04W 4/26; H04W 4/24
USPC .......... 455/405, 406, 423, 466; 370/259, 310, 370/331–338; 705/30, 34, 39, 44
See application file for complete search history.

(56) References Cited

U.S. PATENT DOCUMENTS 6,415,372 B1 *  7/2002  Zakai et al. ................... 711/165
(Continued)

FOREIGN PATENT DOCUMENTS

| EP | 2 192 718 | 6/2010 | |
| WO | WO 2010/049002 | 5/2010 | |
| WO | WO 2010049002 A1 * | 5/2010 | .............. H04W 4/24 |

OTHER PUBLICATIONS

Albaladejo, A.D.; de Gouveia, F.C.; Corici, M.I.; Magedanz, T., "The PCC Rule in the 3GPP IMS Policy and Charging Control Architecture," Global Telecommunications Conference, 2008. IEEE GLOBECOM 2008. IEEE , vol., No., pp. 1,5, Nov. 30, 2008-Dec. 4, 2008. doi: 10.1109/GLOCOM.2008.ECP.306.*

(Continued)

*Primary Examiner* — Olusegun Goyea
(74) *Attorney, Agent, or Firm* — Baker Botts, LLP

(57) ABSTRACT

The present invention faces the issue of authorizing transactional services by a Policy and Charging Control system. To this end, the present invention provides for an apparatus carrying out a method of authorizing transactional services and comprising: an authorization requester for submitting a transactional service authorization request with a user identifier and a transactional service identifier, and an authorizer for receiving the transactional service authorization request. This authorizer comprises: a PCRF server for authorizing the transactional service based on subscription and service data, an OCS for authorizing the transactional service based on credit authorization, and a decider for deciding service authorization for the transactional service based on the authorizations respectively made by the PCRF server and OCS. The authorizer of this apparatus is also arranged for submitting a transactional service authorization response to the authorization requester with a decision on service authorization for the transactional service.

20 Claims, 10 Drawing Sheets

(51) Int. Cl.
*H04M 11/00* (2006.01)
*H04M 1/66* (2006.01)
*H04M 1/68* (2006.01)
*H04L 12/14* (2006.01)
*H04M 15/00* (2006.01)

(56) References Cited

U.S. PATENT DOCUMENTS

| | | | | |
|---|---|---|---|---|
| 6,467,684 | B2* | 10/2002 | Fite et al. | 235/379 |
| 6,912,383 | B1* | 6/2005 | Li et al. | 455/406 |
| 7,428,658 | B2* | 9/2008 | Nagin et al. | 714/47.1 |
| 7,543,737 | B2* | 6/2009 | Bensimon et al. | 235/380 |
| 8,116,728 | B2* | 2/2012 | Cai et al. | 455/406 |
| 8,160,544 | B2* | 4/2012 | Myers et al. | 455/406 |
| 8,175,575 | B2* | 5/2012 | Cai et al. | 455/406 |
| 8,285,861 | B2* | 10/2012 | Hu et al. | 709/228 |
| 8,353,000 | B2* | 1/2013 | He et al. | 726/1 |
| 8,630,925 | B2* | 1/2014 | Bystrom et al. | 705/30 |
| 2004/0088249 | A1* | 5/2004 | Bartter et al. | 705/39 |
| 2004/0088250 | A1* | 5/2004 | Bartter et al. | 705/39 |
| 2004/0102182 | A1* | 5/2004 | Reith et al. | 455/410 |
| 2005/0269399 | A1* | 12/2005 | Bensimon et al. | 235/380 |
| 2006/0107102 | A1* | 5/2006 | Nagin et al. | 714/7 |
| 2008/0229385 | A1* | 9/2008 | Feder et al. | 726/1 |
| 2009/0023427 | A1* | 1/2009 | Kahn et al. | 455/414.1 |
| 2009/0194582 | A1* | 8/2009 | Ye | 235/375 |
| 2009/0228956 | A1* | 9/2009 | He et al. | 726/1 |
| 2011/0022722 | A1* | 1/2011 | Castellanos Zamora et al. | 709/235 |
| 2011/0067085 | A1* | 3/2011 | Brouard et al. | 726/1 |
| 2011/0270722 | A1* | 11/2011 | Cai et al. | 705/34 |
| 2011/0275344 | A1* | 11/2011 | Momtahan et al. | 455/405 |
| 2011/0276442 | A1* | 11/2011 | Momtahan et al. | 705/30 |
| 2011/0320620 | A1* | 12/2011 | Cutler et al. | 709/229 |
| 2012/0099715 | A1* | 4/2012 | Ravishankar et al. | 379/114.01 |
| 2012/0117235 | A1* | 5/2012 | Castro Castro et al. | 709/224 |
| 2012/0123919 | A1* | 5/2012 | Li et al. | 705/34 |
| 2012/0144049 | A1* | 6/2012 | Lopez Nieto et al. | 709/228 |
| 2012/0231785 | A1* | 9/2012 | Poon et al. | 455/423 |
| 2012/0259747 | A1* | 10/2012 | Bystrom et al. | 705/30 |
| 2012/0284189 | A1* | 11/2012 | Gardella et al. | 705/44 |
| 2012/0309346 | A1* | 12/2012 | Yang et al. | 455/406 |
| 2012/0314632 | A1* | 12/2012 | Martinez De La Cruz et al. | 370/310 |
| 2012/0320801 | A1* | 12/2012 | Yang et al. | 370/259 |
| 2012/0327813 | A1* | 12/2012 | Mohammed et al. | 370/259 |

OTHER PUBLICATIONS

Curpen, R., Sandu, F., Costache, C., & Danciu, G. M. (2013). Solutions for Roaming and Interoperability Problems Between LTE and 2G or 3G Networks. Review of the Air Force Academy, (2), 29-36. Retrieved from http://search.proquest.com/docview/1462044317?accountid=14753.*

3GPP TR 23.813 V0.5.0, 3rd Generation Partnership Project; Technical Specification Group Services and System Aspects; Study on Policy solutions and enhancements (Release 10) (Feb. 2011).

3GPP TS 23.203 V11.1.0, 3rd Generation Partnership Project; Technical Specification Group Services and System Aspects; Policy and charging control architecture (Release 11) (Mar. 2011).

3GPP TS 32.274 V10.0.0, 3rd Generation Partnership Project; Technical Specification Group Services and System Aspects; Telecommunication management; Charging management; Short Message Service (SMS) charging (Release 10) (Mar. 2011).

3GPP TS 32.299 V10.1.0, 3rd Generation Partnership Project; Technical Specification Group Services and System Aspects; Telecommunication management; Charging management; Diameter charging applications (Release 10) (Mar. 2011).

RFC 4006, Hakala et al, "Diameter Credit-Control Application", Network Working Group, Request for Comments: 4006, Aug. 2005.

EPO Communication—Extended European Search Report for Application No./Patent No. 11188037.3-1853/2523389, Jun. 26, 2014.

3GPP TSG SA WG2 Meeting #76; Source; ZTE; Title; Proposal for optimization of PCC procedures by Sy reference enhancement; TD S2-101031, Feb. 22-26, 2010.

3rd Generation Partnership Project; Technical Specification Group Core Network and Terminals; Policy and Charging Control over Rx reference point (Release 11), 2011.

* cited by examiner

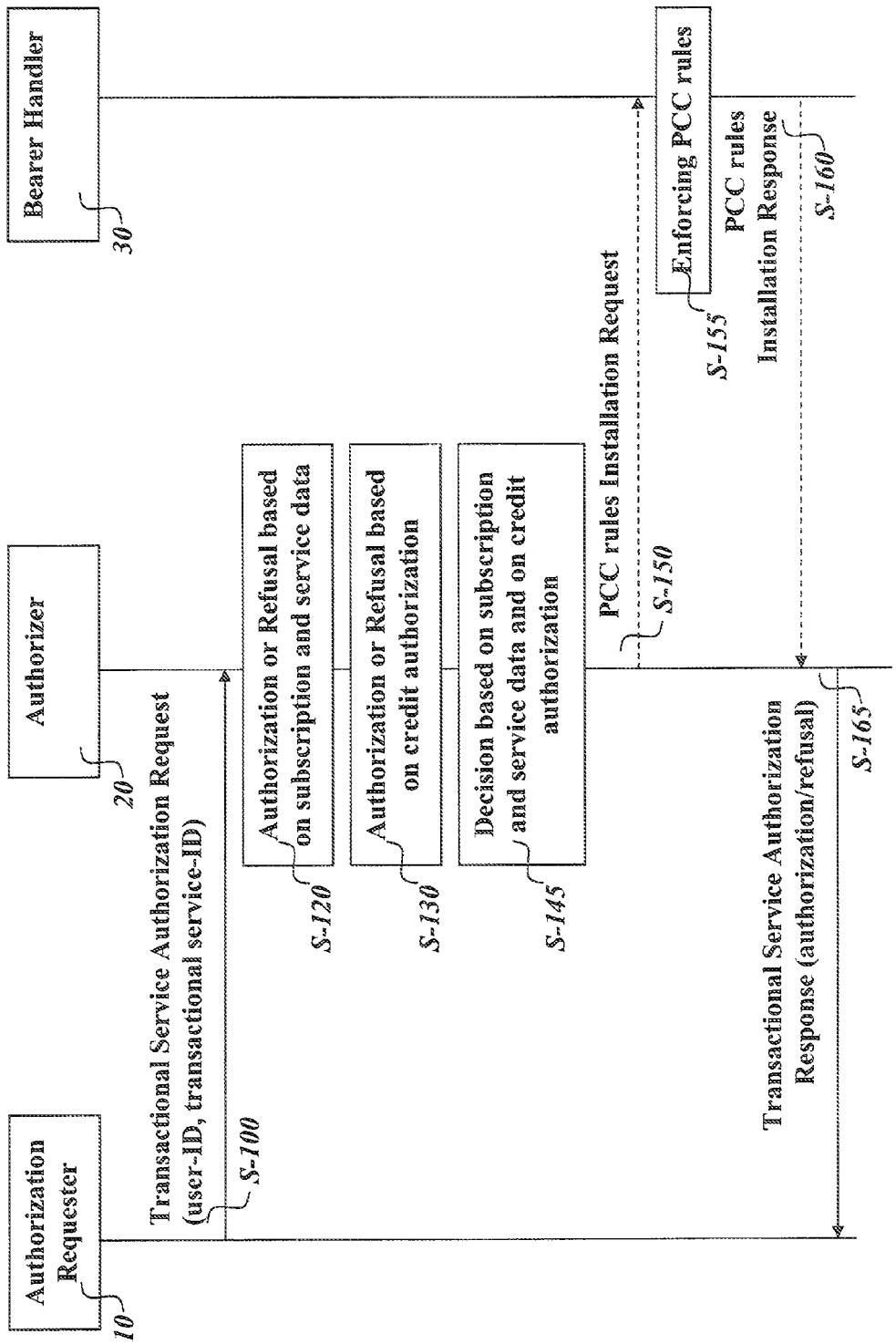
FIG. -1-

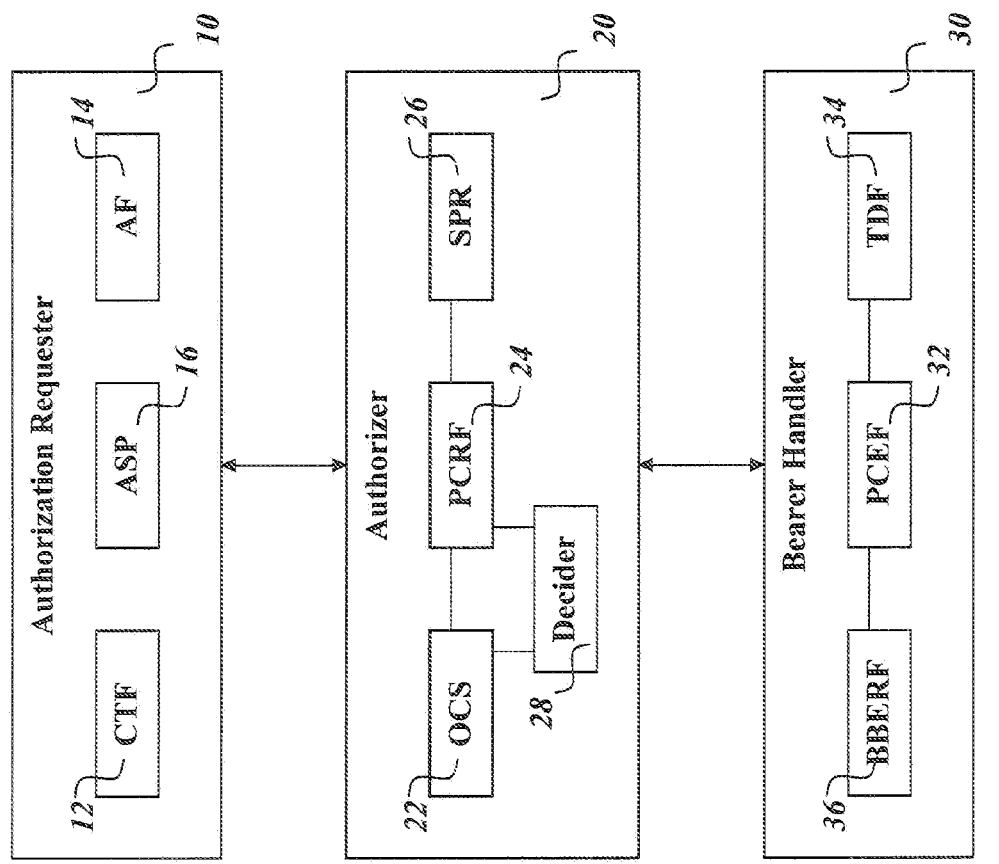
FIG. -2-

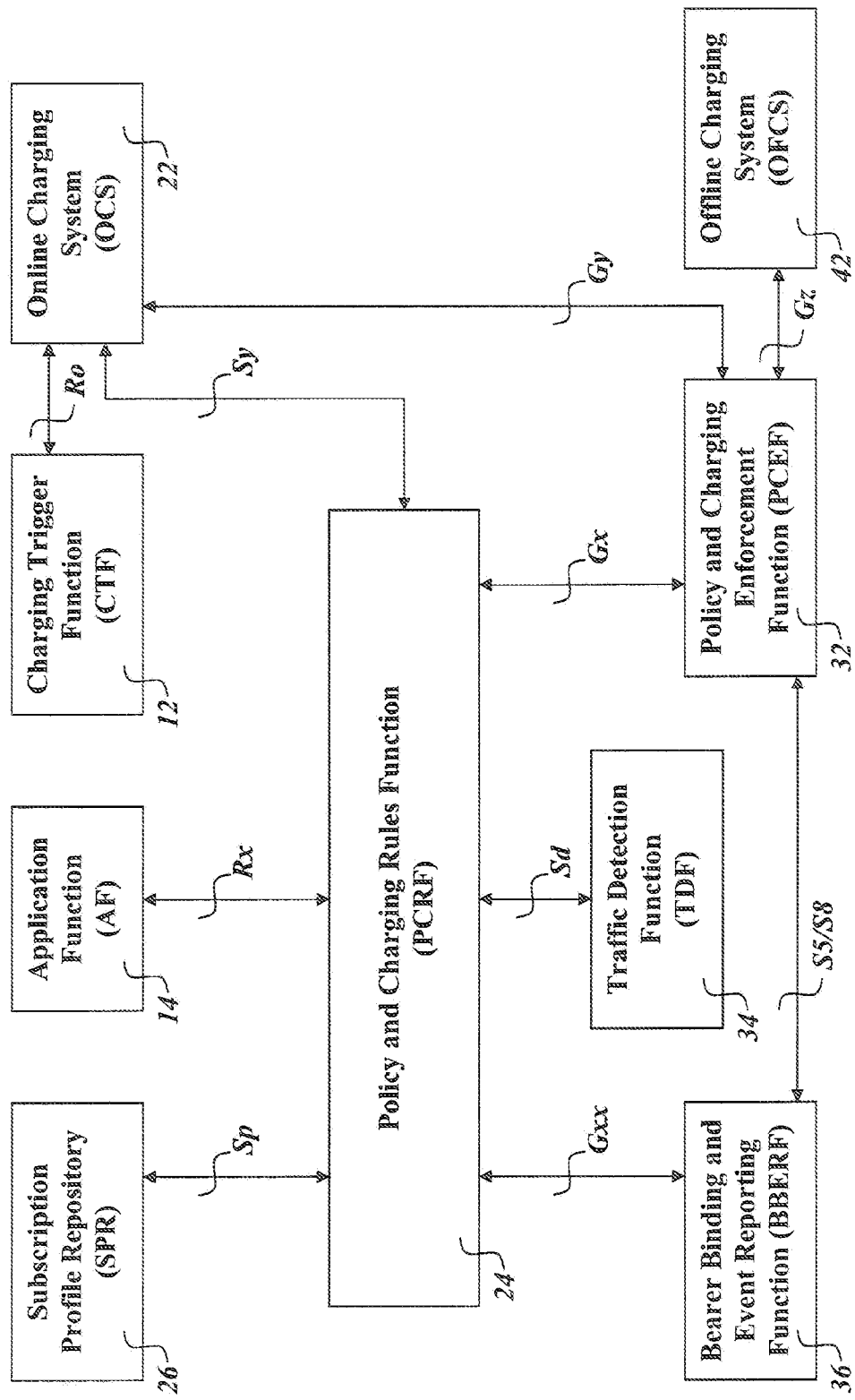
FIG. -3-

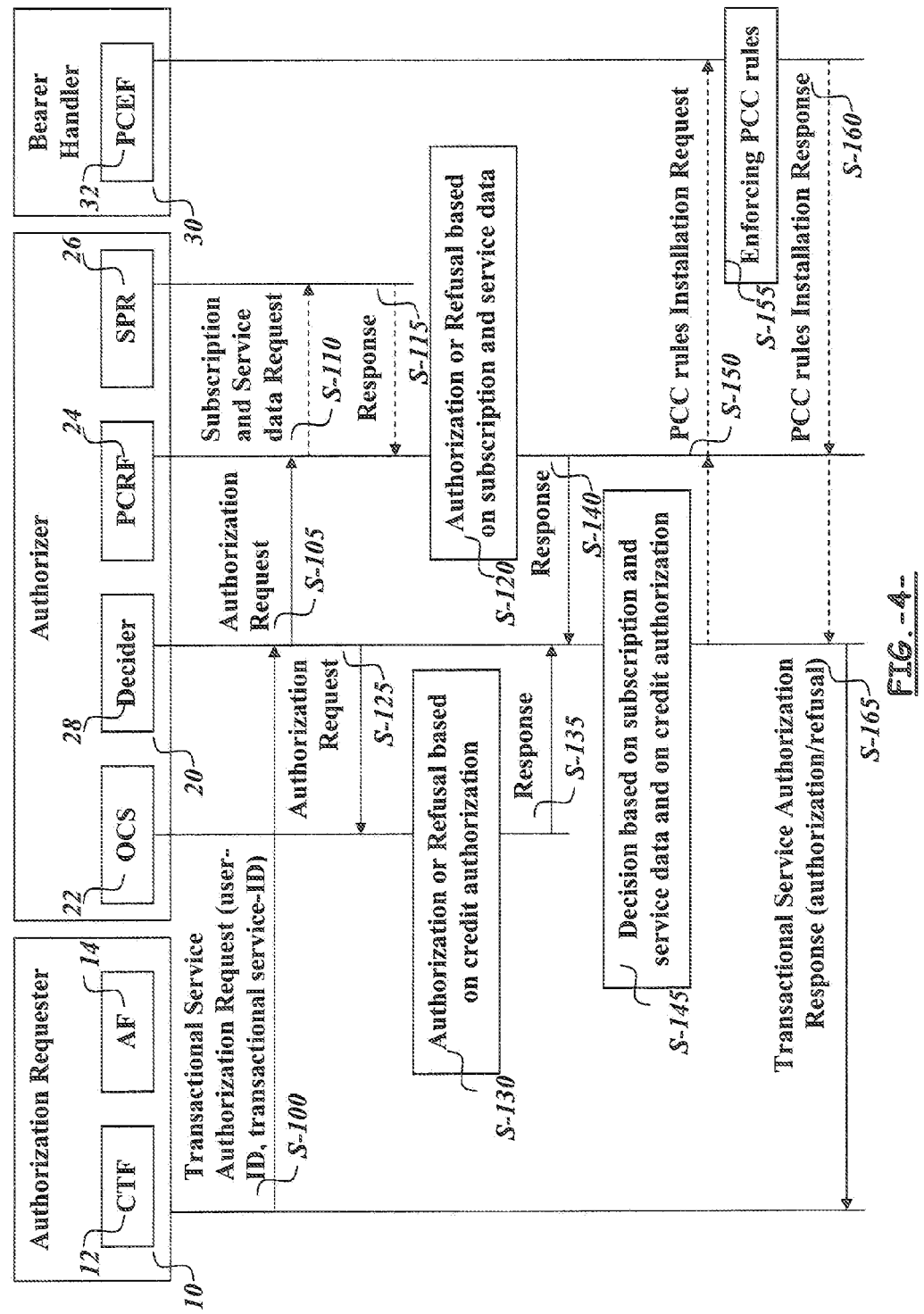
FIG. -4-

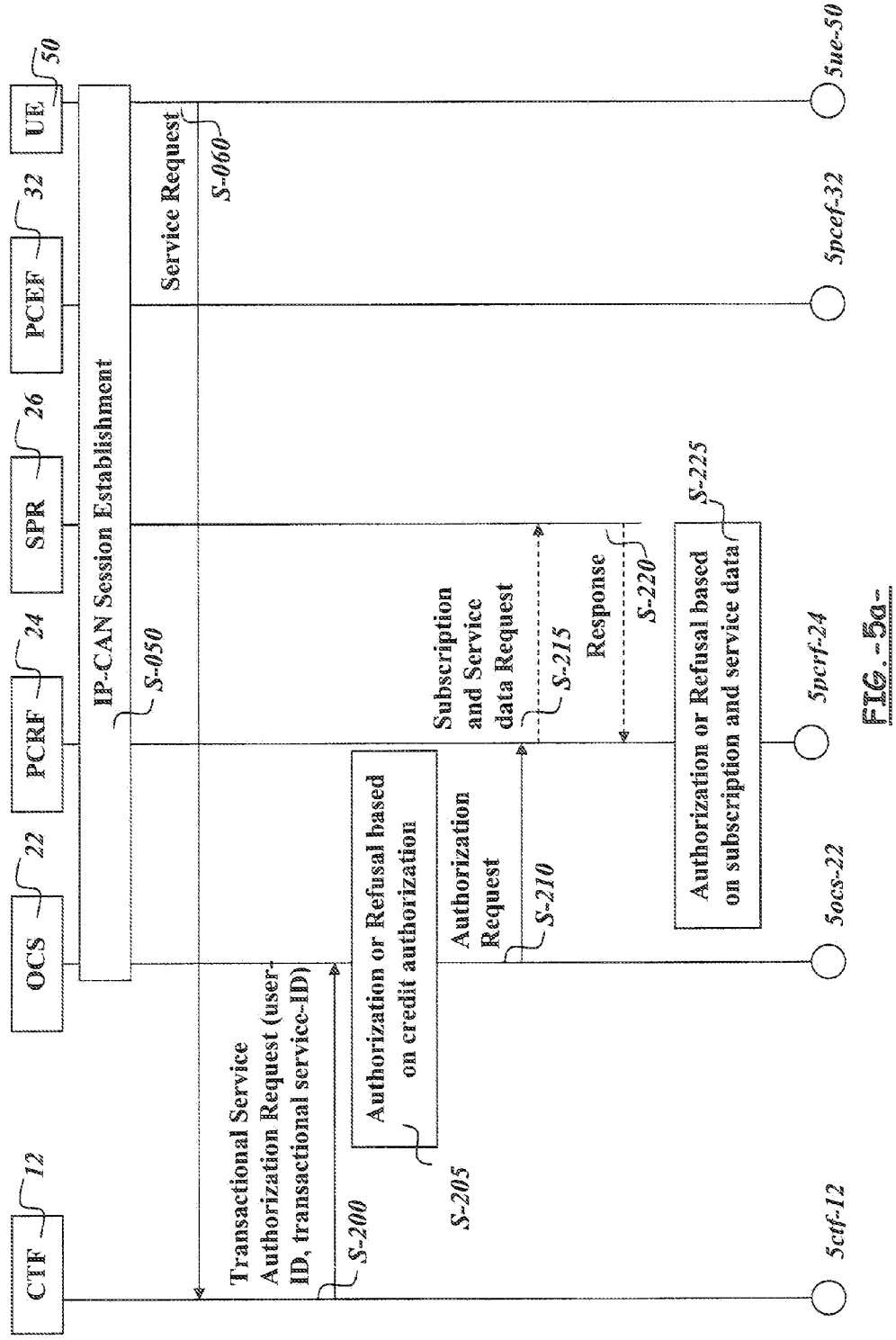

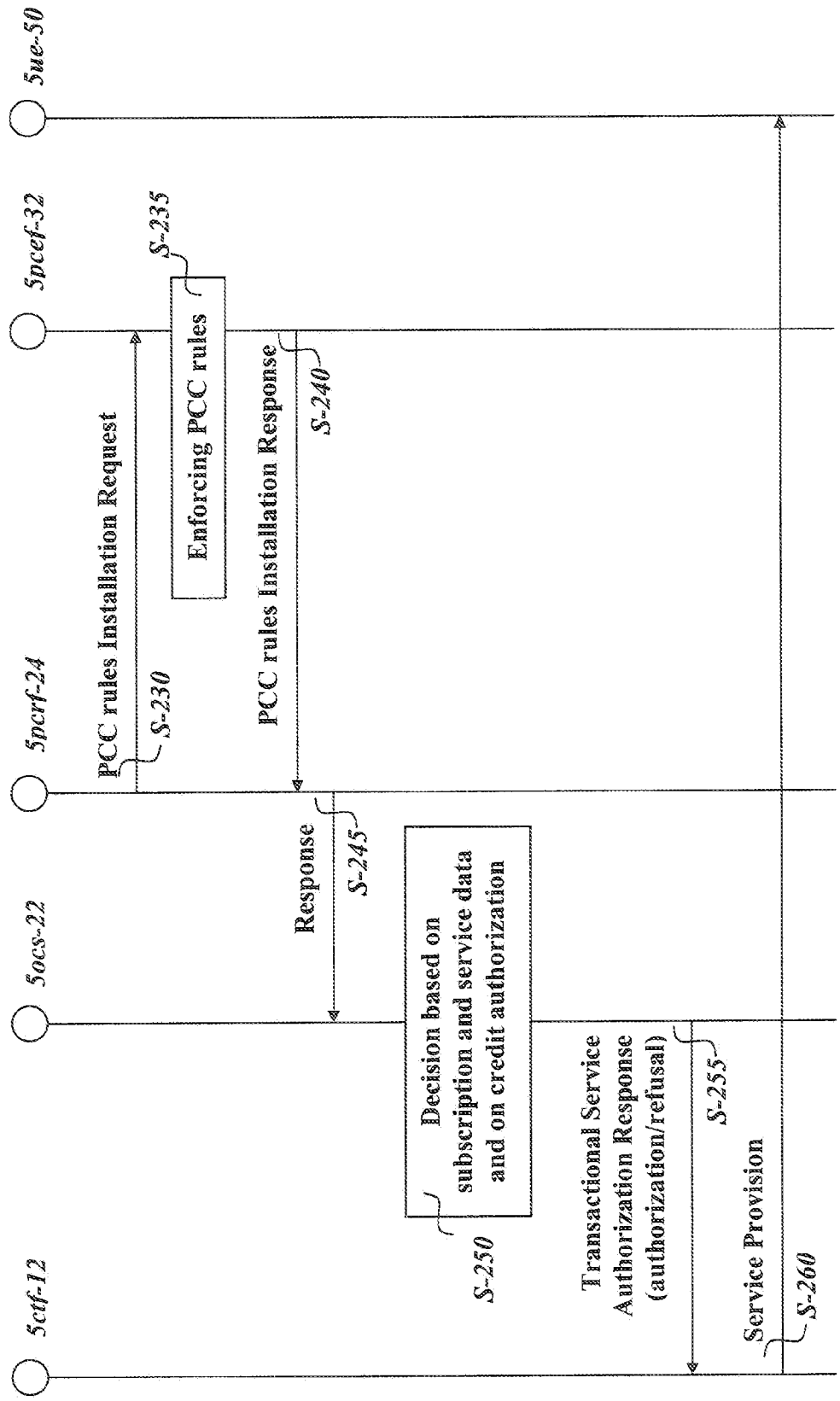
FIG. -5b-

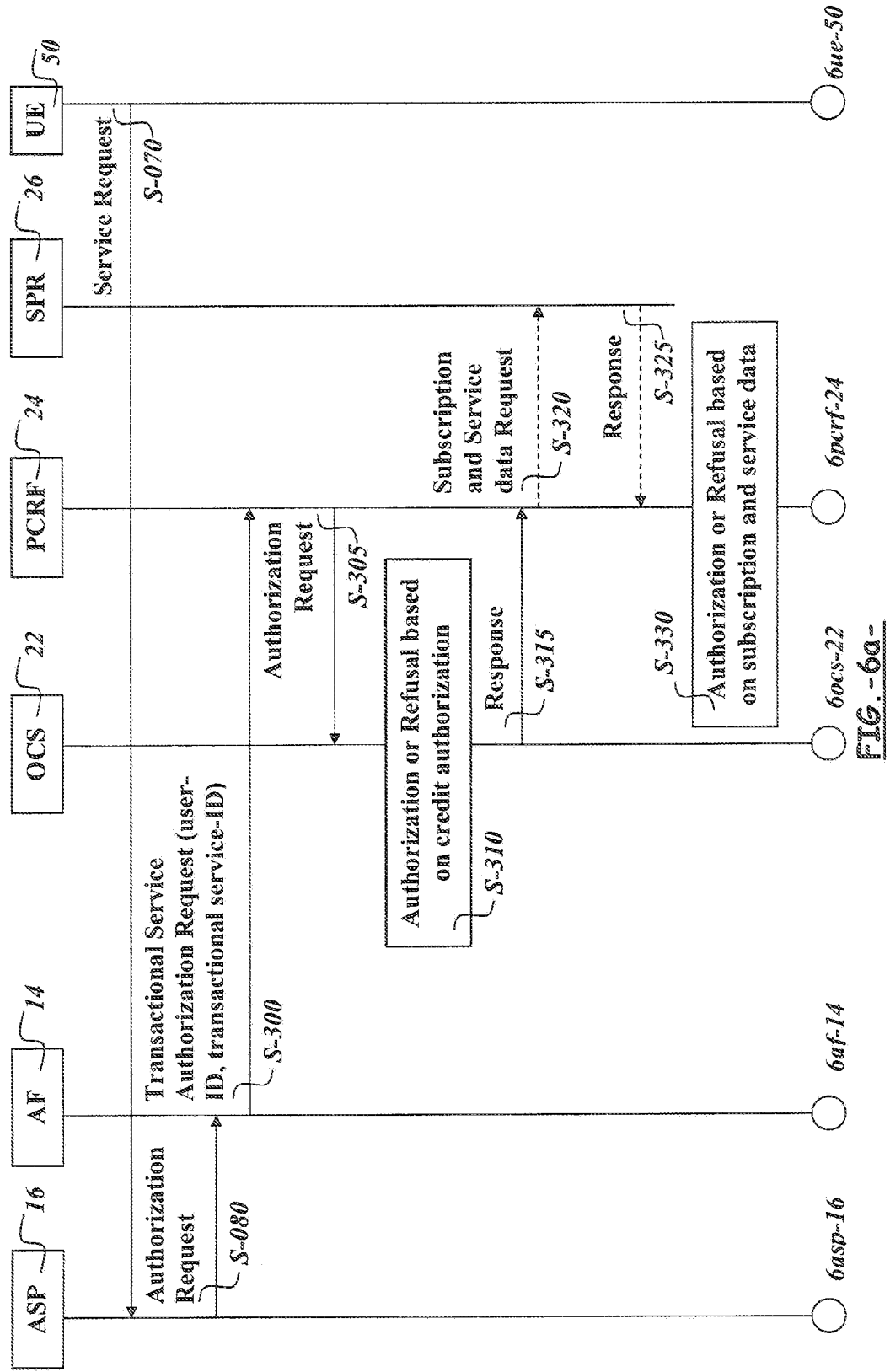

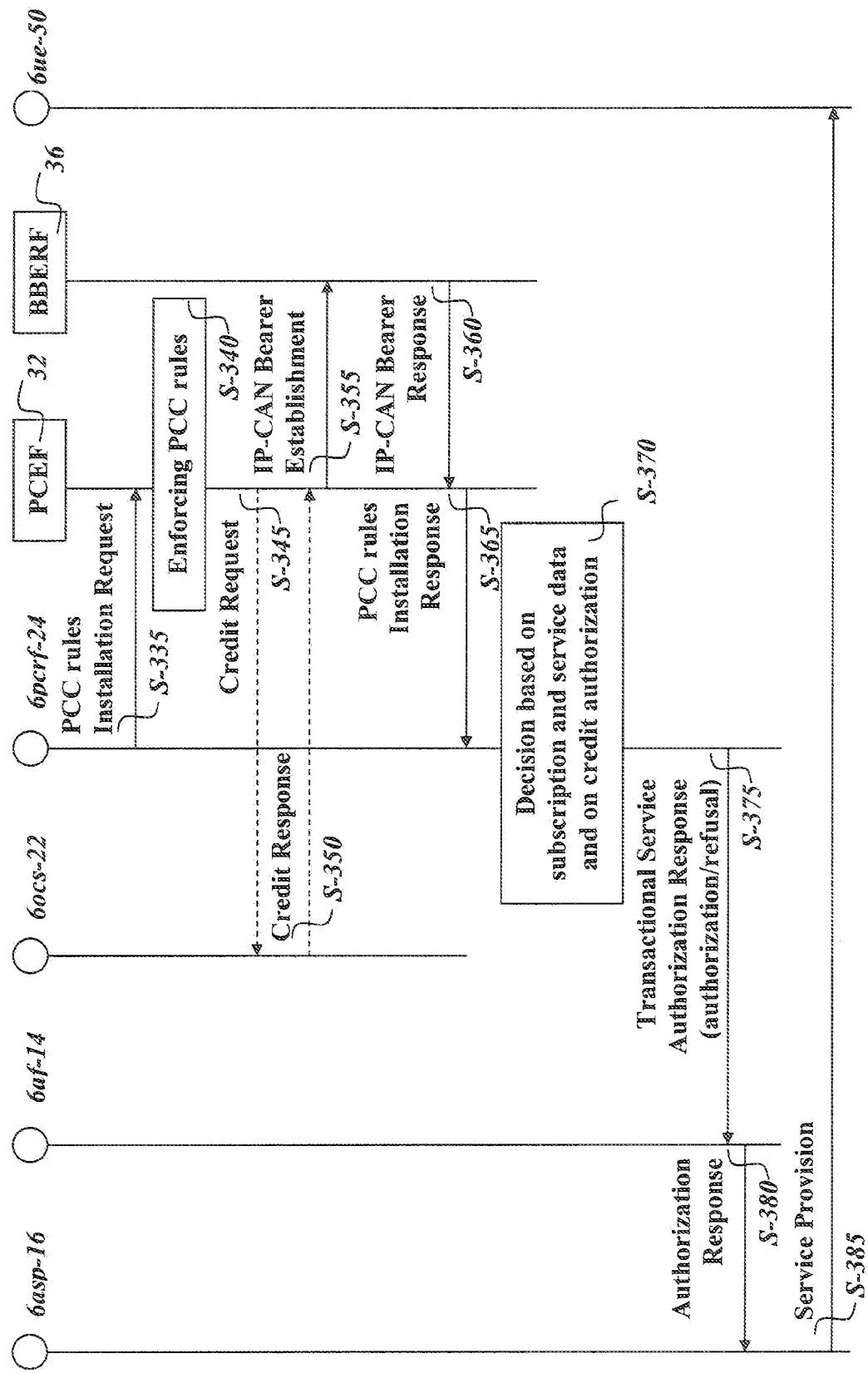
FIG. -6b-

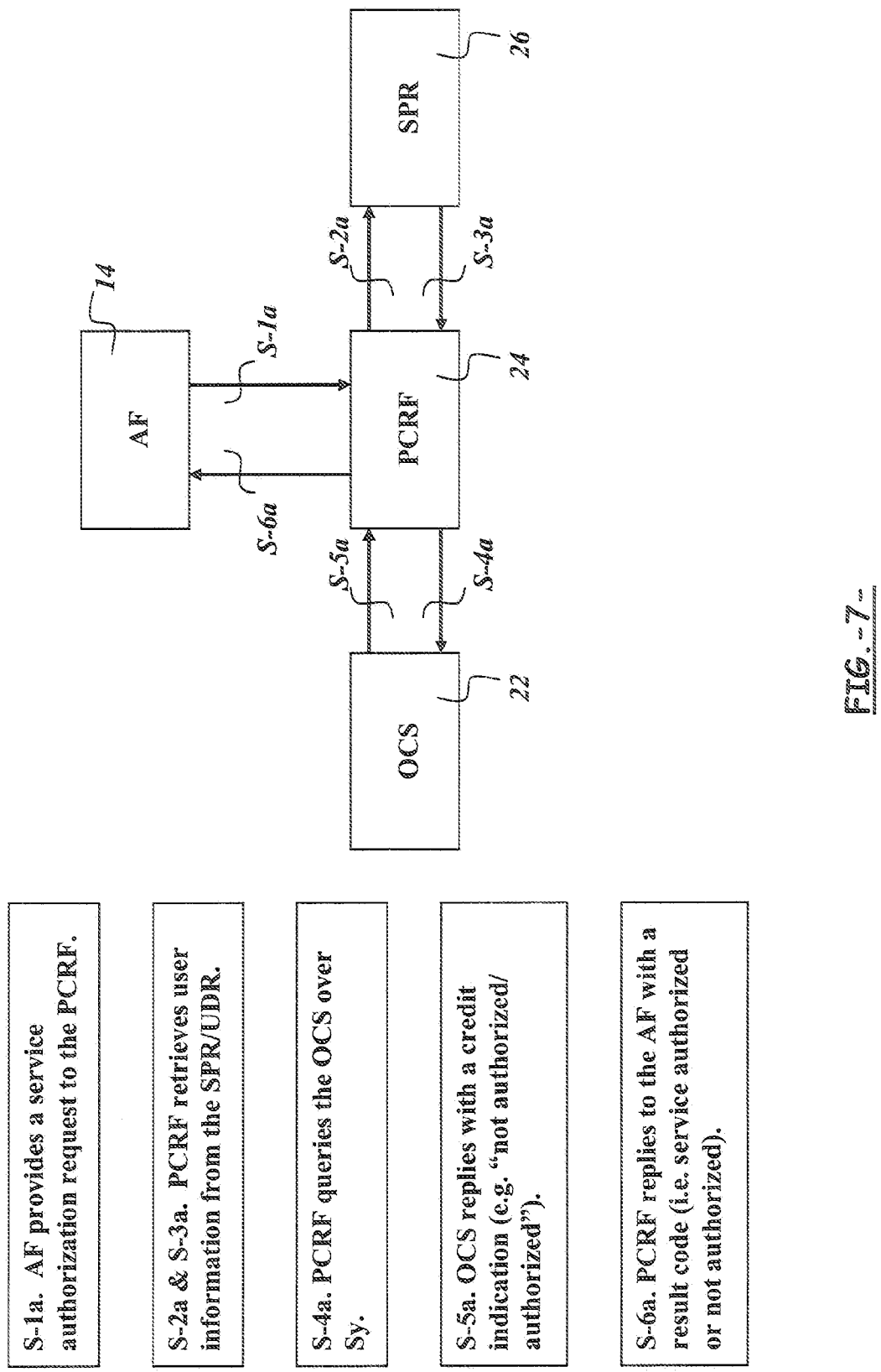
FIG. -7-

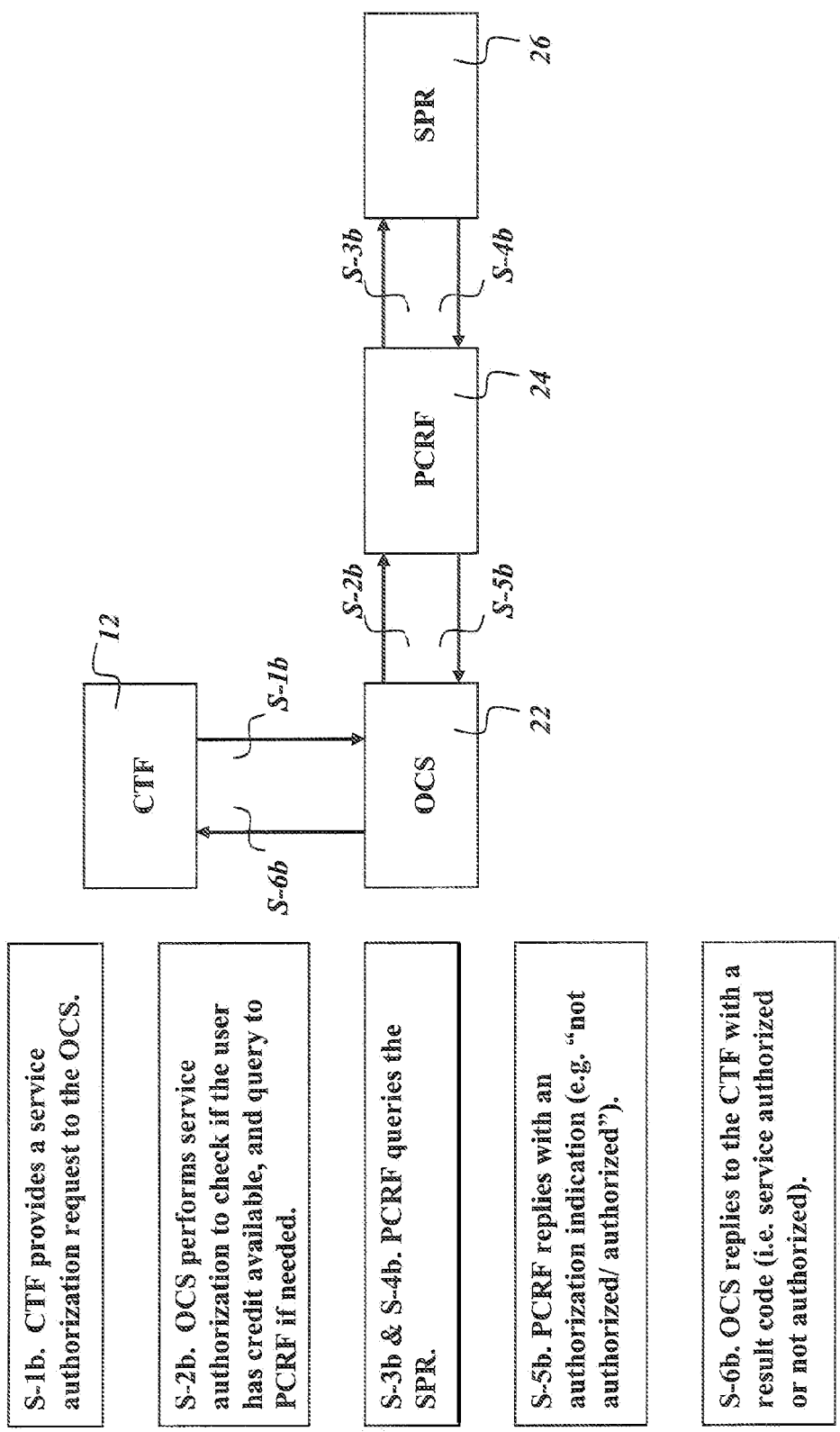
FIG. -8-

METHOD AND APPARATUS FOR AUTHORIZING A TRANSACTIONAL SERVICE BY A POLICY AND CHARGING CONTROL ARCHITECTURE

This application is claims the benefit of U.S. Provisional No. 61/483,815, filed on May 9, 2011, and claims priority to EP Application No. 11188037.3 filed on Nov. 7, 2011, the entire contents of each of which are hereby incorporated by reference.

TECHNICAL FIELD

The present invention generally relates to authorization of transactional services; and, more particularly, to authorization of transactional services by a Policy and Charging Control architecture.

BACKGROUND

At present, 3GPP TS 23.203 v.11.1.0 (March-2011) discloses a Policy and Charging Control (PCC) architecture in a telecommunications system, which allows applying charging and quality of service (QoS) policies to data flows of user data sessions.

The PCC architecture comprises: a Policy and Charging Enforcement Function (PCEF), which is in charge of traffic flow detection and enforcement of applicable policies to user traffic flows; a Policy and Charging Rules Function (PCRF), which is in charge of providing network control for the traffic flow detection by holding policies and providing PCC rules to the PCEF per user traffic flow basis; a Traffic Detection Function (TDF), which is in charge of performing application detection and reporting detected applications and service data flow descriptions to the PCRF; a Bearer Binding and Event Reporting Function (BBERF), which is in charge of receiving from the PCRF QoS rules on the treatment of each service data flow and of ensuring that the service data flow is carried over the bearer with the appropriate QoS; an Application Function (AF), which is in charge of submitting to the PCRF a description of the media to be delivered at the bearer layer; a Charging Trigger Function (CTF), which is in charge of triggering charging events; an Online Charging System (OCS), which handles charging information affecting, in real-time, the service to be provided and the control of network resources required; an Offline Charging System (OFCS), which handles charging information not affecting the service in real-time, but provided to the operator after having used the network resources; and a Subscription Profile Repository (SPR), which holds subscription and service data for subscribers of the telecommunication system.

A number of key issues have been identified in order to further develop the PCC architecture. These key issues are currently investigated, in terms of different alternatives to follow, under the scope of 3GPP TS 23.813 v.0.5.0 (2011 February). One of these key issues is identified in clause 4.6 of 3GPP TS 23.813 as 'Extending Policy Architecture to handle transactional services'; however, it is still left For Further Study (FFS) therein.

Since current or legacy services, such as e.g. SMS, as well as future services, such as e.g. video rental, are of transactional nature, and in the absence of a further development of this key issue in TGPP TS 23.813, there is thus a need for a complete mechanism for handling policies for such transactional services via the PCC architecture.

SUMMARY

The present invention is aimed to at least minimize the above drawbacks and provides for a new method of authorizing transactional services by a PCC system, and a new apparatus for carrying out such method.

In particular, and for the purpose of the present invention, a PCC system is a system that includes some entities of a PCC architecture enhanced for handling policies and taking decisions on whether a transactional service for a user may be authorized or not, based on subscription and service data and on credit authorization for the user.

In accordance with a first aspect of the present invention, there is provided a new method of authorizing transactional services by a PCC system.

This method comprises the steps of: an authorization requester submitting a transactional service authorization request with a user identifier and a transactional service identifier towards an authorizer of the PCC system; the authorizer taking a decision on service authorization for the transactional service based on subscription and service data and on credit authorization related to the user identifier and transactional service identifier; and the authorizer submitting a transactional service authorization response to the authorization requester with the decision on service authorization for the transactional service.

In particular, for the sake of backward compatibility with entities generally available in a PCC system, the step in this method of taking a decision on service authorization may include the steps of: a PCRF server of the PCC system authorizing or refusing the transactional service based on subscription and service data related to the user identifier and transactional service identifier; and an OCS of the PCC system authorizing or refusing the transactional service based on credit authorization related to the user identifier and transactional service identifier.

For the sake of completeness in respect of conventional PCC procedures, upon authorizing the transactional service based on the subscription and service data and based on the credit authorization, this method may further comprise a step of the PCRF server submitting PCC rules for IP Connectivity Access Network "IP-CAN" bearer establishment towards a PCEF device, and a step of receiving at the PCRF server a confirmation of IP-CAN bearer establishment from the PCEF device. Likewise, the PCRF server may submit QoS rules towards a BBERF device, directly or indirectly through the PCEF device, and may receive a corresponding confirmation.

Where the PCRF server of the PCC system is authorizing or refusing the transactional service based on subscription and service data related to the user identifier and transactional service identifier, this method may advantageously comprise a step of the PCRF server obtaining the subscription and service data related to the user identifier and transactional service identifier from an SPR of the PCC system.

In an embodiment of the invention, the steps of submitting the transactional service authorization request and receiving the transactional service authorization response are carried out by a CTF device. Where this is the case, the steps of receiving the transactional service authorization request and submitting the transactional service authorization response may be carried out by the OCS of the PCC system.

Moreover, in this embodiment the method may further comprise a step of the OCS obtaining from the PCRF server authorization or refusal of the transactional service based on subscription and service data. Where this is the case, the step of taking the decision on service authorization based on subscription and service data and on credit authorization may be carried out by the OCS.

In another embodiment of the invention, the steps of submitting the transactional service authorization request and receiving the transactional service authorization response are carried out by an AF device. Where this is the case, the steps of receiving the transactional service authorization request and submitting the transactional service authorization response may be carried out by the PCRF server of the PCC system.

Moreover, in this embodiment the method may further comprise a step of the PCRF server obtaining from the OCS authorization or refusal of the transactional service based on credit authorization. Where this is the case, the step of taking the decision on service authorization based on subscription and service data and on credit authorization may be carried out by the PCRF server.

In accordance with a second aspect of the present invention, there is provided an apparatus for authorizing transactional services by a PCC system.

This apparatus comprises: an authorization requester arranged for submitting a transactional service authorization request with a user identifier and a transactional service identifier; and an authorizer of the PCC system, arranged for receiving the transactional service authorization request, arranged for taking a decision on service authorization for the transactional service based on subscription and service data and on credit authorization related to the user identifier and transactional service identifier, and arranged for submitting a transactional service authorization response to the authorization requester with the decision on service authorization for the transactional service.

Aligned with the above method and for the sake of backward compatibility with entities generally available in a PCC system, the authorizer of this apparatus may comprise: a PCRF server of the PCC system, arranged for authorizing or refusing the transactional service based on subscription and service data related to the user identifier and transactional service identifier; an OCS of the PCC system, arranged for authorizing or refusing the transactional service based on credit authorization related to the user identifier and transactional service identifier, and a decider arranged for taking a decision on service authorization for the transactional service based on the authorizations or refusals made by the PCRF server and OCS, respectively based on the subscription and service data and on the credit authorization.

As for the above method and for the sake of completeness in respect of conventional PCC procedures, upon authorizing the transactional service based on the subscription and service data and based on the credit authorization, the PCRF server may be arranged for submitting PCC rules for IP-CAN bearer establishment towards a PCEF device, and is arranged for receiving a confirmation of IP-CAN bearer establishment from the PCEF device. In particular scenarios, the PCRF server may be arranged for submitting QoS rules towards a BBERF device, either directly or indirectly through the PCEF device.

In particular, the PCRF server may further be arranged for obtaining the subscription and service data related to the user identifier and transactional service identifier from an SPR of the PCC system.

In an embodiment, the authorization requester comprises a CTF device arranged for submitting the transactional service authorization request and for receiving the transactional service authorization response. Where this is the case, the OCS of the PCC system may be arranged for receiving the transactional service authorization request and for submitting the transactional service authorization response. Moreover, in this embodiment the OCS may be arranged for obtaining from the PCRF server authorization or refusal of the transactional service based on subscription and service data. Furthermore, the OCS may include the decider and may be thus arranged for taking the decision on service authorization based on the subscription and service data and on the credit authorization.

In another embodiment, the authorization requester comprises an AF device arranged for submitting the transactional service authorization request and for receiving the transactional service authorization response. Where this is the case, the PCRF server of the PCC system may be arranged for receiving the transactional service authorization request and for submitting the transactional service authorization response. Moreover, in this embodiment the PCRF server may be arranged for obtaining from the OCS authorization or refusal of the transactional service based on credit authorization. Furthermore, the PCRF server may include the decider and may be thus arranged for taking the decision on service authorization based on the subscription and service data and on the credit authorization.

Both embodiments may be combined so that, for example, the authorization requester may comprise both CTF device and AF device arranged for submitting the transactional service authorization request and for receiving the transactional service authorization response.

In accordance with a third aspect of the present invention, there is provided a more specific apparatus addressing components of the PCC system for authorizing transactional services by the PCC system. This more specific apparatus is well adapted to carry out the above method disclosed as a first aspect of the invention.

This apparatus comprises: an authorization requester arranged for submitting a transactional service authorization request with a user identifier and a transactional service identifier towards an authorizer of the PCC system. In this apparatus, the authorizer is arranged for receiving the transactional service authorization request and comprises: a PCRF server of the PCC system, which is arranged for authorizing the transactional service taking into account subscription and service data related to the user identifier and transactional service identifier; an OCS of the PCC system, which is arranged for authorizing the transactional service taking into account credit authorization related to the user identifier and transactional service identifier; and a decider for deciding service authorization for the transactional service based on the authorizations respectively made by the PCRF server and OCS taking into account the subscription and service data and the credit authorization. The authorizer of this apparatus is also arranged for submitting a transactional service authorization response to the authorization requester with a decision on service authorization for the transactional service.

Also in this apparatus, the PCRF server may particularly be arranged for obtaining the subscription and service data related to the user identifier and transactional service identifier from an SPR of the PCC system.

In a first embodiment of this apparatus, the authorization requester may include a CTF device arranged for submitting the transactional service authorization request with the user identifier and the transactional service identifier. In this first embodiment, the OCS of the authorizer may include the decider, and may be arranged for: receiving the transactional service authorization request from the CTF device, obtaining the authorization based on the subscription and service data from the PCRF server, deciding service authorization for the transactional service based on the subscription and service data and on the credit authorization, and submitting the transactional service authorization response to the CTF device with the decision on service authorization for the transactional service.

In a second embodiment of this apparatus, the authorization requester may include an AF device arranged for submitting the transactional service authorization request with the user identifier and the transactional service identifier. In this second embodiment, the PCRF server of the authorizer may include the decider, and may be arranged for: receiving the transactional service authorization request from the AF device, obtaining the credit authorization from the OCS, deciding service authorization for the transactional service based on the subscription and service data and on the credit authorization, and submitting the transactional service authorization response to the AF device with the decision on service authorization for the transactional service.

These first and second embodiments are aligned with corresponding embodiments disclosed above for the apparatus described in accordance with the second aspect of the invention. Such embodiments may be combined as disclosed above so that, for example, the authorizer may comprise both OCS and PCRF server arranged for deciding service authorization for the transactional service based on the subscription and service data and on the credit authorization, likely depending on whether the transactional service authorization request is received from the CTF device or from the AF device.

On the other hand, the invention may be practised by a computer program, in accordance with a fourth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 basically represents a method of authorizing a transactional service for a user by a PCC system.

FIG. 2 shows an exemplary apparatus for carrying out an embodiment of the method illustrated in FIG. 1.

FIG. 3 shows a basic structure of PCC architecture and interfaces between different PCC entities in accordance with currently applicable standards.

FIG. 4 shows an exemplary sequence of actions in accordance with an embodiment of the method illustrated in FIG. 1, and which can be carried out by the exemplary apparatus illustrated in FIG. 2.

FIGS. 5a and 5b illustrate a first embodiment of the method in FIG. 1, which may be applicable in a scenario where a CTF device requests the authorization of a transactional service.

FIGS. 6a and 6b illustrate a second embodiment of the method in FIG. 1, which may be applicable in a scenario where an AF device requests the authorization of a transactional service.

FIG. 7 shows another simplified view of the second embodiment illustrated in FIGS. 6a and 6b.

FIG. 8 shows another simplified view of the first embodiment illustrated in FIGS. 5a and 5b.

DETAILED DESCRIPTION

The following describes currently preferred embodiments of apparatus and method for authorizing transactional services by a PCC system. As already commented above, the PCC system includes entities of the PCC architecture enhanced for handling policies and taking decisions on whether a transactional service for a user may be authorized or not, based on subscription and service data and on credit authorization for the user.

In this respect, a PCC system is depicted in FIG. 3 and comprises network elements arranged for carrying out functions of the PCC architecture in accordance with PCC standards. Thus, an AF device 14 is a network element arranged for carrying out the functionality of an AF in accordance with PCC standards; a CTF device 12 is a network element arranged for carrying out the functionality of a CTF in accordance with PCC standards; a PCRF server 24 is a network element arranged for carrying out the functionality of a PCRF in accordance with PCC standards; a PCEF device 32 is a network element arranged for carrying out the functionality of a PCEF in accordance with PCC standards; a TDF device 34 is a network element arranged for carrying out the functionality of a TDF in accordance with PCC standards; a BBERF device 36 is a network element arranged for carrying out the functionality of a BBERF in accordance with PCC standards; an SPR 26 is a network element arranged for carrying out the functionality of an SPR in accordance with PCC standards; an OCS 22 is a network element arranged for carrying out the functionality of an OCS in accordance with PCC standards; and an OFCS 42 is a network element arranged for carrying out the functionality of an OFCS in accordance with PCC standards.

Some of these network elements, as further disclosed throughout the present specification, are enhanced to accomplish the objects of the present invention.

Still with reference to FIG. 3, different interfaces are used to connect the network elements in accordance with PCC standards. For instance, the PCRF server 24 is connected with the SPR 26 via the 'Sp' interface, with the AF device 14 via the 'Rx' interface, with the OCS 22 via the 'Sy' interface, with the PCEF device 32 via the 'Gx' interface, with the TDF device 34 via the 'Sd' interface, and with the BBERF device 36 via the 'Gxx' interface; the PCEF device 32 is connected with the OCS 22 via the 'Gy' interface, with the OFCS 42 via the 'Gz' interface and with the BBERF device 36 via the 'S5/S8' interface; and the CTF device 12 is connected with the OCS 22 via the 'Ro' interface.

Some of these interfaces, as further disclosed throughout the present specification, are enhanced to accomplish the objects of the present invention.

FIG. 1 illustrates a general method of authorizing transactional services by a PCC system. In accordance with this method and as FIG. 1 shows, an authorization requester 10 submits during a step S-100 a transactional service authorization request with a user identifier and a transactional service identifier towards an authorizer 20 of the PCC system.

The authorizer 20 receiving the authorization request takes an authorization decision during a step S-145 based on subscription and service data and based on credit authorization related to the user identifier and transactional service identifier. To this end, as illustrated in FIG. 1, the authorizer may firstly make, during a step S-120, an authorization or refusal based on subscription and service data, and may secondly make, during a step S-130, an authorization or refusal based on credit authorization; or vice verse. In principle, which authorization or refusal is made firstly or subsequently may depend on particular embodiments further discussed, or may be irrelevant inasmuch as they both are taken into consideration in order to make a decision on authorizing the transactional service.

Particularly useful in scenarios requiring the installation of PCC rules prior to authorizing the transactional service, and upon having taken a positive decision on such authorization, the authorizer 20 may submit during a step S-150 PCC rules to be installed towards a bearer handler entity 30 at the bearer layer where IP flows for the user are handled and likely analyzed. Then, the bearer handler enforces during the step S-155 the received PCC rules and submits an installation response back to the authorizer during the step S-160. Likewise, and not illustrated in this drawing, the authorizer 20 may submit QoS rules to be installed towards the bearer handler entity 30.

Eventually, the authorizer 20 submits during a step S-165 back to the authorization requester 10 a transactional service authorization response indicating whether the transactional service is authorized or refused.

In an embodiment of the invention illustrated in FIG. 2, the authorizer 20 may comprise an OCS 22, a PCRF server 24 and a decider 28, the OCS 22 being responsible for authorizing or refusing the transactional service based on credit authorization, the PCRF server 24 being responsible for authorizing or refusing the transactional service based on subscription and service data, and the decider 28 being responsible for receiving the authorization request for the transactional service, for taking a decision on service authorization based on subscription and service data and on credit authorization, and for submitting the authorization response towards the authorization requester.

In particular, as further disclosed in respect other embodiments, the decider 28 may be provided as an integral part of the OCS 22 or as an integral part of the PCRF server 24. In these embodiments, any of OCS 22 and PCRF server 24 may be the one receiving the authorization request, obtaining authorization or refusal from the other one, taking the decision and submitting the authorization response to the authorization requester.

Also in particular, where the PCRF server 24 is not provisioned with subscription and service data for some or all subscribers, the authorizer 20 may also comprise the SPR 26 holding the subscription and service data for subscribers of the telecommunication system and accessible to the PCRF server 24 for the latter to obtain such data.

On the other hand, as FIG. 2 shows, the authorization requester 10 may comprise anyone of the CTF device 12 and the AF device 14, or both, in order to more advantageously offer different alternatives compatible with existing traffic scenarios and existing interfaces.

For instance, in an embodiment of the invention illustrated in FIGS. 5a and 5b, and as further disclosed, the CTF device 12 is the entity receiving a service request and the one submitting the authorization request towards the authorizer 20. Since there is an existing interface 'Ro' between the CTF device 12 and the OCS 22, this authorization request may advantageously be submitted through the interface 'Ro' to be received at the OCS 22, which obtains authorization or refusal from the PCRF server 24, takes the decision and returns the authorization response to the CTF device 12, as commented above when explaining particular alternatives regarding the authorizer 20.

In another embodiment of the invention illustrated in FIGS. 6a and 6b, and as further disclosed, a so-called Application Service Provider (ASP) server 16 is the entity receiving a service request from a user and the one requesting authorization from the AF device 14. Then, the AF device 14 is the entity submitting the authorization request towards the authorizer 20. Since there is an existing interface 'Rx' between the AF device 14 and the PCRF server 24, this authorization request may advantageously be submitted through the interface 'Rx' to be received at the PCRF server 24, which obtains authorization or refusal from the OCS 22, takes the decision and returns the authorization response to the AF device 14, as also commented above when explaining particular alternatives regarding the authorizer 20. For the sake of simplicity, this ASP server 16 is depicted in FIG. 2 as included in the authorization requester 10, though it may be a separate entity not included therein.

FIG. 2 also illustrates the bearer handler 30, which is not expected to be impacted by the distinguishing features of the present specification and is disclosed in the following for the sake of completeness. This bearer handler 30 may comprise, depending on the scenarios where the present invention applies, a BBERF device 36, or a PCEF device 32, or both in order to more advantageously offer different alternatives compatible with existing traffic scenarios. For instance, in the embodiment illustrated with reference to FIG. 5b, just the PCEF device 32 is involved, whereas in the embodiment illustrated with reference to FIG. 6b, both the PCEF device 32 and the BBERF device 36 are involved. Apart from that, in scenarios where a deeper packet inspection is wanted for the IP flows of users, the bearer handler 30 may also include a TDF device 34.

A particular embodiment of the method explained above with reference to FIG. 1 is illustrated in FIG. 4 and explained in the following, also with reference to entities in FIG. 2.

As shown in FIG. 4, the method in this embodiment starts with the submission during the step S-100 of a transactional service authorization request with a user identifier and a transactional service identifier, from the authorization requester 10 towards the authorizer 20 of the PCC system. In this embodiment illustrated in FIG. 4, the decider 28 of the authorizer 20 is the entity receiving the transactional service authorization request and submitting corresponding authorization requests to the PCRF server 24 and to the OCS 22 during respective steps S-105 and S-125 which, in principle, might be sequenced in any order.

Upon receiving the authorization request at the PCRF server 24 during the step S-105, if subscription and service data for the indicated user identifier and transactional service identifier are not available at the PCRF server, the latter requests such subscription and service data during a step S-110 to the SPR 26, which in turn submits them during the step S-115 to the PCRF server. Once the subscription and service data are available at the PCRF server 24, owned therein or received from the SPR 26, the PCRF server 24 authorizes or refuses the service during the step S-120 based on the subscription and service data, and submits a response with the authorization or refusal towards the decider 28 during a step S-140.

More or less simultaneously, before or afterwards, upon receiving the authorization request at the OCS 22 during the step S-125, the OCS authorizes or refuses the service during the step S-130 based on the credit authorization held therein for the indicated user identifier and transactional service identifier. Then, the OCS 22 submits a response with the authorization or refusal towards the decider 28 during a step S-135.

Once the decider 28 is aware of the respective authorization or refusal from OCS and PCRF server, the decider takes a decision based on the subscription and service data and on the credit authorization during the step S-145.

As commented above for the method illustrated in FIG. 1, where this decision is positive, the PCRF server is notified so that, if required, PCC rules are installed. If this were the case, the PCRF server 24 may submit during the step S-150 the PCC rules to be installed towards the PCEF device 32 of the bearer handler entity 30. Then, the PCEF device 32 enforces during the step S-155 the received PCC rules and submits an installation response back to the PCRF server 24 during the step S-160.

Then, the decider 28 submits during the step S-165 back to the authorization requester 10 the transactional service authorization response indicating whether the transactional service is authorized or refused.

As already commented above, in an embodiment of the invention, the transactional service authorization request and corresponding response may respectively be submitted and received during the steps S-100 and S-165 by the CTF device 12 of the authorization requester, and the decider 28 may be an integral part of, or included in, the OCS 22. Where this is the case, the authorization request and response exchanged during steps S-125 and S-135 between the decider 28 and the OCS 22 may be considered to be internally or implicitly carried out by the OCS adapted for taking the decision as the decider 28; and the transactional service authorization request and corresponding response are respectively received and submitted from this OCS as well. Moreover, where this is the case, this OCS adapted for taking the decision as the decider may also be adapted for obtaining during the step S-140 from the PCRF server 24 the authorization or refusal of the transactional service based on subscription and service data. Nevertheless, a still further embodiment following this approach is further disclosed with reference to FIGS. 5a and 5b.

As also commented above, in another embodiment of the invention, the transactional service authorization request and corresponding response may respectively be submitted and received during the steps S-100 and S-165 by the AF device 14 of the authorization requester, and the decider 28 may be an integral part of, or included in, the PCRF server 24. Where this is the case, the authorization request and response exchanged during steps S-105 and S-140 between the decider 28 and the PCRF server 24 may be considered to be internally or implicitly carried out by the PCRF server adapted for taking the decision as the decider; and the transactional service authorization request and corresponding response are respectively received and submitted from this PCRF server as well. Moreover, where this is the case, this PCRF server adapted for taking the decision as the decider 28 may also be adapted for obtaining during the step S-135 from the OCS 22 the authorization or refusal of the transactional service based on credit authorization. Nevertheless, a still further embodiment following this approach is further disclosed with reference to FIGS. 6a and 6b.

FIGS. 5a and 5b illustrate an embodiment of the method explained above with reference to FIG. 1, wherein the CTF device 12 of the authorization requester is the entity submitting the transactional service authorization request and receiving the corresponding authorization response, and wherein the OCS 22 of the authorizer is the entity receiving the transactional service authorization request, taking the decision and submitting the corresponding authorization response. This method is explained in the following, also with reference to entities in FIG. 2.

The method in this embodiment starts with the establishment of an IP Connectivity Access Network (IP-CAN) session during a step S-050. The establishment of this IP-CAN session mainly involves the user with user equipment (UE) 50, the PCEF device 32 and the PCRF server 24, and may also involve the OCS 22 and the SPR 26. This establishment of an IP-CAN session is, for the purpose of the present invention, a conventional procedure following currently applicable standards and thus only cited for the sake of clarity. In particular, the PCEF device, and/or a BBERF device 36 not depicted in this drawing, notifies on the establishment of the IP-CAN session and/or a so-called Gateway Control Session toward the PCRF server 24 following the procedures described in 3GPP TS 23.203.

Once the IP-CAN session has been established, the UE 50 may submit a transactional service request during a step S-060 towards the CTF device 12. In particular, the CTF device 12 may be included in the ASP server 16, which would be considered an ASP server with CTF capabilities. For the sake of simplicity in this drawing, just the CTF device is illustrated.

The CTF device 12 submits a transactional service authorization request during a step S-200 towards the OCS 22. For the sake of a simpler design, this submission may be similar to the existing 'CTF check balance request' by using the interface 'Ro' as described in RFC-4006 and 3GPP TS 32.299.

The OCS 22 performs during a step S-205 an enhanced check balance procedure in order to either authorizing or refusing the transactional service based on credit authorization. Generally speaking, a Balance Check operation is disclosed in the IETF RFC-4006, wherein a Diameter credit-control client may only have to verify that the end user's account balance covers the cost of a certain service without reserving any units from the account at the time of the inquiry. This method does not guarantee that credit would be left when the Diameter credit-control client requests the debiting of the account with a separate request.

For the purpose of the present invention, the enhanced check balance procedure does not only verify whether the end user's account balance covers or not the cost of a certain service, with or without reserving credit for the service, but it may also take into account other criteria, such as subscriber category, subscription options and nature of the transactional service, in order to determine a credit authorization and either authorizing or refusing the transactional service based on this credit authorization.

Where a negative decision is taken by the OCS 22 during a step S-250, a transactional service authorization response is returned during the step S-255 over the interface 'Ro' indicating 'Refusal', and the intermediate sequence of actions described in the following are not carried out.

Where a positive decision is taken by the OCS 22 and the transactional service is authorized based on credit authorization, the OCS 22 submits a corresponding authorization request over the interface 'Sy' during a step S-210 towards the PCRF server 24.

The PCRF server 24 checks if the user is allowed to receive the service by taking into account a user profile for the user, for example, whether the user category is gold, silver or bronze, and the PCRF server either authorizes or refuses the transactional service based on subscription and service data during a step S-225. To this end, the PCRF server 24 may query the SPR 26 during a step S-215, and the SPR may provide the user profile for the user, including the subscription and service data, to the PCRF server during a step S-220. If the user is not authorized to receive the service, the PCRF server 24 sends a negative response during a step S-245 to the OCS 22 over the interface 'Sy' indicating that the service is refused. Then, the OCS 22 takes a negative decision during a step S-250, a transactional service authorization response is returned during the step S-255 over the interface 'Ro' indicating 'Refusal' to the CTF device 12, and the sequence of actions carried out during steps S-230 to S-240 do not take place.

Where the transactional service is authorized based on the subscription and service data, the PCRF server 24 derives PCC rules related to the transactional service and submits said PCC rules during a step S-230 to be installed at the PCEF device. The PCEF device 32 installs and enforces the received PCC rules during a step S-235 and returns an installation response back to the PCRF server 24 during a step S-240. Additionally or alternatively to the submission and enforcement of the PCC rules, and not illustrated in this drawing, the PCRF server 24 may derive QoS rules related to the transactional service and may submit said QoS rules towards a BBERF device 36. The BBERF device 36 would enforce the received QoS rules and would return a response back to the PCRF server 24.

The PCRF server 24 sends during a step S-245 a response to the OCS 22, over the interface 'Sy', on whether the service is authorized for the user. The OCS 22, which had already authorized the transactional service based on credit authorization, can now take a decision during a step S-250 on service authorization for the transactional service based on the subscription and service data, as received from the PCRF server, and based on the credit authorization. The OCS 22 then submits a transactional service authorization response during the step S-255, over the interface 'Ro', to the CTF device 12 indicating whether the transactional service is authorized or refused for the user.

Where the decision indicates that the transactional service is authorized the UE 50 can receive the desired service during a step S-260 from the CTF device 12, or rather from the ASP server 16 with CTF capabilities.

A different and simplified view of the embodiment described with reference to FIGS. 5a and 5b is depicted in FIG. 8. As illustrated in FIG. 8, a CTF device 12 provides during a step S-1b a service authorization request to the OCS 22. The OCS 22, during a step S-2b, performs service authorization to check if the user has credit available, and queries to the PCRF server 24, if needed. During steps S-3b and S-4b, the PCRF server queries the SPR 26. The PCRF server, during a step S-5b, replies with an authorization indication, e.g. 'not authorized/authorized', to the OCS 22. The OCS 22, during a step S-6b, replies to the CTF device 12 with a result code, i.e. 'authorized or not authorized'.

FIGS. 6a and 6b illustrate an embodiment of the method explained above with reference to FIG. 1, wherein the AF device 14 of the authorization requester is the entity submitting the transactional service authorization request and receiving the corresponding authorization response, and wherein the PCRF server 24 of the authorizer is the entity receiving the transactional service authorization request, taking the decision and submitting the corresponding authorization response. This method is explained in the following, also with reference to entities in FIG. 2.

The method in this embodiment starts where a user with UE 50 submits a transactional service request towards the so-called ASP server 16 during a step S-070. The ASP server 16, in the embodiment illustrated in FIGS. 6a and 6b, requests the AF device 14 during a step S-080 to check if the user is authorized to receive the service.

The AF device 14 establishes a session with the PCRF server 24 over the interface 'Rx' as described in 3GPP TS 23.203, and submits a transactional service authorization request towards the PCRF server 24 during a step S-300. In this transactional service authorization request, the AF device includes a user identifier, such as IMSI, MSISDN or UE IP address, a transactional service identifier and, likely, service information including Flow Descriptions. Moreover, the AF device 14 may subscribe to notifications notifying the AF device of related bearer level events, such as transmission resources being established, released or lost.

The PCRF server requests, over the interface 'Sy' and during a step S-305, the authorization of the transactional service from the OCS 22 based on a credit authorization. The OCS 22 performs during a step S-310 an enhanced check balance procedure, as disclosed above, and either authorizes or refuses the transactional service based on credit authorization. That is, the enhanced check balance procedure verifies whether the end user's account balance covers or not the cost of a certain service, with or without reserving credit for the service, and it may also take into account other criteria, such as subscriber category, subscription options and nature of the transactional service, in order to determine a credit authorization and either authorizing or refusing the transactional service based on this credit authorization.

Where a positive decision is taken, the transactional service is authorized; otherwise, it is refused. The OCS 22 then returns an authorization response back to the PCRF server 24 during the step S-315 over the interface 'Sy' indicating whether the transactional service is authorized or refused based on the credit authorization.

Where the response from the OCS 22 indicates that the transactional service is refused based on the credit authorization, the actions performed during steps S-320 to S-365 are not carried out, and the PCRF server 24 takes a negative decision during the step S-370.

Where the response from the OCS 22 indicates that the transactional service is authorized based on the credit authorization, the PCRF server 24 checks if the user is allowed to receive the service by taking into account a user profile for the user, for example, whether the user category is gold, silver or bronze, and the PCRF server either authorizes or refuses the transactional service based on subscription and service data during a step S-330. To this end, the PCRF server 24 may query the SPR 26 during a step S-320, and the SPR may provide the user profile for the user, including the subscription and service data, to the PCRF server during a step S-325.

If the user is not authorized to receive the service, based on the subscription and service data, the PCRF server 24 takes a negative decision during the step S-370, and the sequence of actions carried out during steps S-335 to S-365 do not take place.

Where the transactional service is authorized based on the subscription and service data, the PCRF server 24 derives PCC rules related to the transactional service and submits said PCC rules during a step S-335 to be installed at the PCEF device. The PCEF device 32 installs and enforces the received PCC rules during a step S-340 and, if online charging is applicable, the PCEF device 32 may request during a step S-345 credit information for new charging keys from the OCS 22. The OCS then provides the credit information to the PCEF device during a step S-350.

Triggered by the installation and enforcement of the PCC Rules, the PCEF device 32 may send an IP-CAN bearer establishment request towards a BBERF device 36 during a step S-355, and receive a corresponding response from the BBERF device during a step S-360 to confirm there are resources available for service delivery. This submission may be carried out through the 'S5/S8' interface. In particular, the IP-CAN bearer establishment request may include QoS rules to be installed at the BBERF device for the transactional service. Then, the PCEF device 32 returns an installation response back to the PCRF server 24 during a step S-365.

In other embodiments applicable to different scenarios, and not illustrated in any drawing, the PCRF server 24 may submit QoS rules through the 'Gxx' interface, to be installed at the BBERF device 36 for the transactional service, and the BBERF device 36 may correspondingly acknowledge such installation.

Still with reference to FIG. 6b, the PCRF server 24 takes a decision during a step S-370 based on the subscription and service data and on the credit authorization, as received from the OCS 22, and taking into account, where applicable, the response received from the PCEF device 32 on the PCC rules installation and resources available at the BBERF device 36.

The PCRF server 24 then submits a transactional service authorization response during the step S-375, over the interface 'Rx', to the AF device 14 indicating whether the transactional service is authorized or refused for the user, and the AF device returns a corresponding response during a step S-380 to the ASP server 16. Where the decision indicates that the transactional service is authorized the UE 50 can receive the desired service during a step S-385 from the ASP server 16.

A different and simplified view of the embodiment described with reference to FIGS. 6a and 6b is depicted in FIG. 7. As illustrated in FIG. 7, an AF device 14 provides during a step S-1a a service authorization request to the PCRF server 24. The PCRF server 24 retrieves during steps S-2a and S-3a user information from the SPR 26. The PCRF server 24 queries during a step S-4a the OCS 22 over the interface 'Sy', and the OCS 22 replies during a step S-5a with a credit indication, e.g. authorized or not authorized. The PCRF server 24 replies during a step S-6a to the AF device 14 with a result code, i.e. service authorized or not authorized.

Apart from the embodiments disclosed above, other considerations about the main distinguishing features of the invention are disclosed in the following.

Regarding the usage of the interface 'Rx' for authorizing transactional services, the AF takes the role of issuing transactional service requests towards the PCRF. The AF can either be triggered internally, if directly supporting the transactional service, or be triggered externally by the server supporting the transactional service. The Rx reference point is used to support the transactional service by allowing the AF to identify the transactional service requiring authorization by the PCRF.

In contrast to current support for application level session information based on IP flows, the transactional services only require the identification of the service to be authorized over the interface, e.g. possible re-use of the AF application identifier.

The PCRF would perform service authorization for the transactional service based on information received from the SPR/UDR for the user and the service identifier provided over Rx, e.g. service authorized or not authorized depending on network and user preferences. In addition to that, based on operator policies that determine whether service authorization depends on charging information, the PCRF may decide to request credit authorization from OCS.

The decision to authorize a requested transactional service would then be delivered directly to the AF over the Rx reference point.

Main advantage of this approach appears to be the reuse of existing infrastructure to support an authorization request by an Application Function supporting the transactional service to the PCRF acting as a Policy Decision Point to authorize requests for transactional services. The PCRF would respond with success/failure indication to the authorization request.

This would be based on: a new procedure may be needed if we allow this "one-shot" transactional service authorization without AF session actually being established, i.e. if IP-CAN session is not available; SPR maintains status of authorized services; PCRF queries OCS for credit authorization; the PCRF would respond with a success/failure indication to the authorization request.

An assumption is that the SPR information is maintained by the Transactional Service Logic. It is out of 3GPP scope how the transactional service maintains the information in the SPR. One possible advantage to such restrictions is seen as re-use of existing infrastructure and centralized administration and control provided by the PCRF and SPR in enhancing the subscriber profile to supporting transactional service authorization requests.

The authorization of transactional services such as SMS in key issue maps to existing functionality in 3GPP namely the 'Ro' interface. The 'Ro' based on RFC 4006, clause 6, supports a "one-time event", namely a request/answer transaction of type event. This could serve as a basis for 'Rx' changes. It is proposed that the PCRF can provide the necessary authorization.

Regarding the usage of the interface 'Ro' for authorizing transactional services, the authorization of transactional services maps to existing functionality in 3GPP, namely the 'Ro' interface, which is built on Diameter Credit Charging Application defined in RFC 4006. The 3GPP TS 32.299 Diameter Charging Applications describes for online charging the 'Ro' interface point between the OCS and Charging Trigger Function (CTF).

It is proposed that the service node supporting the Transactional service logic would act at as the CTF towards the online charging function. Three cases for control of user credit for online charging are currently supported: Immediate Event Charging IEC; Event Charging with Unit Reservation (ECUR); and Session Charging with Unit Reservation (SCUR).

The Immediate Event Charging IEC can be re-used to Request Authorization of the Transactional Services prior to service content delivery by performing an event based Direct Debiting operation. The network element supporting Transactional Service Logic must ensure the requested service execution is successful. An alternative approach is to introduce an enhancement, already commented above, which allows for a check of the subscriber's account balance without performing an immediate debit.

The exemplary transactional service of SMS, listed in key issue description, is currently supported via Ro and further described in TS 32.274 (SMS Charging).

In general for Transactional Services a successful direct debiting would correspond to a successful authorization. An appropriate 'Failed' answer or answer with result code, e.g. END_USER_SERVICE_DENIED or NO-CREDIT, would apply for a failed authorization. In combination with the 'Sy' reference point between OCS and PCRF, the OCS can request PCRF to authorize the service over 'Sy'.

Main advantage of this approach appears to be that the authorization of transactional services, such as in key issue, maps to existing functionality in 3GPP namely the 'Ro' interface. It is proposed that the OCS can provide the necessary authorization.

One possible solution based on this could be through reuse of 'Ro' interface. This would be based on: OCS queries PCRF for service authorization with a new procedure that allows one-shot" transactional service authorization without 'Sy' session actually being established; SPR maintains status of authorized services; the PCRF would respond with a success/failure indication to the authorization request; and OCS replies to the application that issues a transactional service request.

Generally speaking, the main advantages of the invention are listed in the following: the PCC architecture is extended to handle transactional services; introduction of a new procedure allowing "one-shot" transactional service authorization; authorization of service can be based on central deployed PCRF and SPR containing subscription info worth to service authorization settings; coordination of authorization decision can be handled via the 'Sy' between the OCS and the PCRF; reusing existing PCC infrastructure allowing policy control of future transactional based services; and in conjunction with OCS, charging can also be applied for future transactional services authorized by the PCRF.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of authorizing transactional services by a Policy and Charging Control "PCC" system, the method comprising the steps of:
   receiving, by a computer processor operating as a decider of the PCC system, a transactional service authorization request with a user identifier and a transactional service identifier from one of an Application Function (AF) device and a Charging Trigger Function (CTF) device;
   obtaining, by the computer processor operating as the decider, an authorization or refusal for the transactional service from a Policy Charging Rules Function (PCRF) server of the PCC system based on subscription and service data related to the user identifier and transactional service identifier;
   obtaining, by the computer processor operating as the decider, an authorization or refusal for the transactional service from an Online Charging System (OCS) of the PCC system based on credit authorization related to the user identifier and transactional service identifier;
   taking, by the computer processor operating as the decider, a decision on service authorization for the transactional service based on the respective authorization or refusal obtained from the PCRF server and the OCS; and
   submitting, by the computer processor operating as the decider, a transactional service authorization response to the one of the AF device and the CTF device that submitted the authorization request with the decision on service authorization for the transactional service.

2. The method of claim 1, further comprising:
   upon authorizing the transactional service based on the subscription and service data and based on the credit authorization, submitting, by the PCRF server, PCC rules for IP Connectivity Access Network (IP-CAN) bearer establishment towards a Policy and Charging Enforcement Function (PCEF) device, and
   receiving at the PCRF server a confirmation of IP-CAN bearer establishment from the PCEF device.

3. The method of claim 1, further comprising obtaining, by the PCRF server, the subscription and service data related to the user identifier and transactional service identifier from a Subscription Profile Repository (SPR) of the PCC system.

4. The method of claim 1, wherein receiving the transactional service authorization request and submitting the transactional service authorization response comprises receiving the transactional service authorization request and submitting the transactional service authorization response by the OCS of the PCC system.

5. The method of claim 1, wherein receiving the transactional service authorization request and submitting the transactional service authorization response comprises receiving the transactional service authorization request and submitting the transactional service authorization response by the PCRF server of the PCC system.

6. The method of claim 4, wherein:
   the OCS obtains from the PCRF server authorization or refusal of the transactional service based on subscription and service data, and
   taking the decision on service authorization based on subscription and service data and on credit authorization comprises taking the decision on service authorization by the OCS.

7. The method of claim 5, wherein:
   the PCRF server obtains the authorization or refusal of the transactional service based on credit authorization from the OCS, and
   taking the decision on service authorization comprises taking the decision on service authorization based on subscription and service data and on credit authorization by the PCRF server.

8. An apparatus for authorizing transactional services by a Policy and Charging Control "PCC" system, the apparatus comprising:
   one of an Application Function (AF) and a Charging Trigger Function (CTF) device arranged for submitting a transactional service authorization request with a user identifier and a transactional service identifier; and
   a decider of the PCC system configured to:
      receive the transactional service authorization request;
      obtain an authorization or refusal for the transactional service from a Policy and Charging Rules Function (PCRF) server of the PCC system based on subscription and service data related to the user identifier and the transactional service identifier;
   obtain an authorization or refusal for the transactional service from an Online Charging System (OCS) of the PCC system based on credit authorization related to the user identifier and the transactional service identifier; and
   take a decision on service authorization for the transactional service based on the respective authorization or refusal obtained from the PCRF server and the OCS; and
   submit a transactional service authorization response to the one of the AF device and the CTF device that submitted the authorization request with the decision on service authorization for the transactional service.

9. The apparatus of claim 8, further comprising an authorizer, wherein the authorizer comprises:
   the PCRF server that is configured to authorize or refuse the transactional service based on subscription and service data related to the user identifier and transactional service identifier;
   the OCS that is configured to authorize or refuse the transactional service based on credit authorization related to the user identifier and transactional service identifier; and
   wherein the decider is configured to take the decision on service authorization for the transactional service based on the authorizations or refusals made by the PCRF server and OCS, respectively based on the subscription and service data and on the credit authorization.

10. The apparatus of claim 9, wherein, upon authorizing the transactional service based on the subscription and service data and based on the credit authorization, the PCRF server is configured to:
submit PCC rules for IP Connectivity Access Network (IP-CAN) bearer establishment towards a Policy and Charging Enforcement Function (PCEF) device, and
receive a confirmation of IP-CAN bearer establishment from the PCEF device.

11. The apparatus of claim 9, wherein the PCRF server is further configured to obtain the subscription and service data related to the user identifier and transactional service identifier from a Subscription Profile Repository (SPR) of the PCC system.

12. The apparatus of claim 8, wherein the OCS of the PCC system is configured to receive the transactional service authorization request and for submitting the transactional service authorization response.

13. The apparatus of claim 8, wherein the PCRF server of the PCC system is configured to receive the transactional service authorization request and for submitting the transactional service authorization response.

14. The apparatus of claim 12, wherein the OCS is configured to obtain the authorization or refusal of the transactional service based on subscription and service data from the PCRF server, and wherein the OCS is configured to take the decision on service authorization based on the subscription and service data and on the credit authorization.

15. The apparatus of claim 13, wherein the PCRF server is configured to obtain the authorization or refusal of the transactional service based on credit authorization from the OCS, and wherein the PCRF server is configured to take the decision on service authorization based on the subscription and service data and on the credit authorization.

16. An apparatus for authorizing transactional services by a Policy and Charging Control "PCC" system, the apparatus comprising:
one of an Application Function (AF) device and a Charging Trigger Function (CTF) device configured to submit a transactional service authorization request with a user identifier and a transactional service identifier;
an authorizer of the PCC system configured to receive the transactional service authorization request from the one of the AF device and the CTF device, the authorizer comprising:
a Policy and Charging Rules Function (PCRF) server of the PCC system, the PCRF server configured to authorize the transactional service taking into account subscription and service data related to the user identifier and transactional service identifier,
an Online Charging System (OCS) of the PCC system, the OCS configured to authorize the transactional service taking into account credit authorization related to the user identifier and transactional service identifier, and
a decider configured to decide service authorization for the transactional service based on the authorizations respectively made by the PCRF server and OCS taking into account the subscription and service data and the credit authorization; and
wherein the authorizer is further configured to submit a transactional service authorization response to the one of the AF device and the CTF device that submitted the authorization request with a decision on service authorization for the transactional service.

17. The apparatus of claim 16, wherein the PCRF server is further configured to obtain the subscription and service data related to the user identifier and transactional service identifier from a Subscription Profile Repository (SPR) of the PCC system.

18. The apparatus of claim 16, wherein:
the CTF device is configured to submit the transactional service authorization request with the user identifier and the transactional service identifier;
the OCS of the authorizer includes the decider and is configured to:
receive the transactional service authorization request from the CTF device,
obtain the authorization based on the subscription and service data from the PCRF server,
decide service authorization for the transactional service based on the subscription and service data and on the credit authorization, and
submit the transactional service authorization response to the CTF device with the decision on service authorization for the transactional service.

19. The apparatus of claim 16, wherein:
the AF device is configured to submit the transactional service authorization request with the user identifier and the transactional service identifier;
the PCRF server of the authorizer includes the decider and is configured to:
receive the transactional service authorization request from the AF device,
obtain the credit authorization from the OCS,
decide service authorization for the transactional service based on the subscription and service data and on the credit authorization, and
submit the transactional service authorization response to the AF device with the decision on service authorization for the transactional service.

20. One or more computer-readable non-transitory storage media embodying software that when executed is configured to:
receive a transactional service authorization request with a user identifier and a transactional service identifier from one of an Application Function (AF) device and a Charging Trigger Function (CTF) device;
obtain an authorization or refusal for the transactional service from a Policy Charging Rules Function (PCRF) server of the PCC system based on subscription and service data related to the user identifier and transactional service identifier;
obtaining an authorization or refusal for the transactional service from an Online Charging System (OCS) of the PCC system based on credit authorization related to the user identifier and transactional service identifier;
taking a decision on service authorization for the transactional service based on the respective authorization or refusal obtained from the PCRF server and the OCS; and
submitting a transactional service authorization response to the one of the AF device and the CTF device that submitted the authorization request with the decision on service authorization for the transactional service.

* * * * *